Patented Jan. 1, 1946

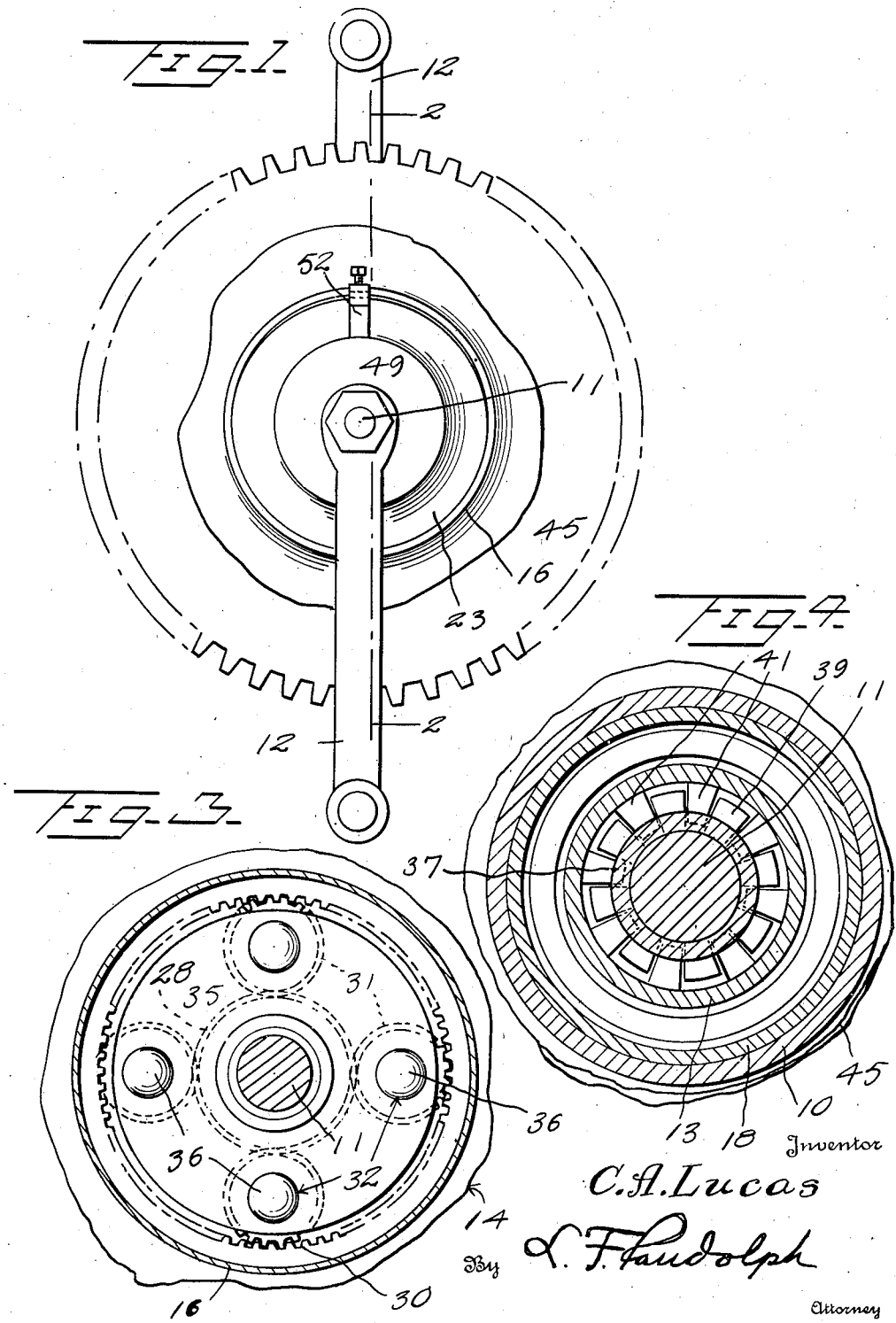

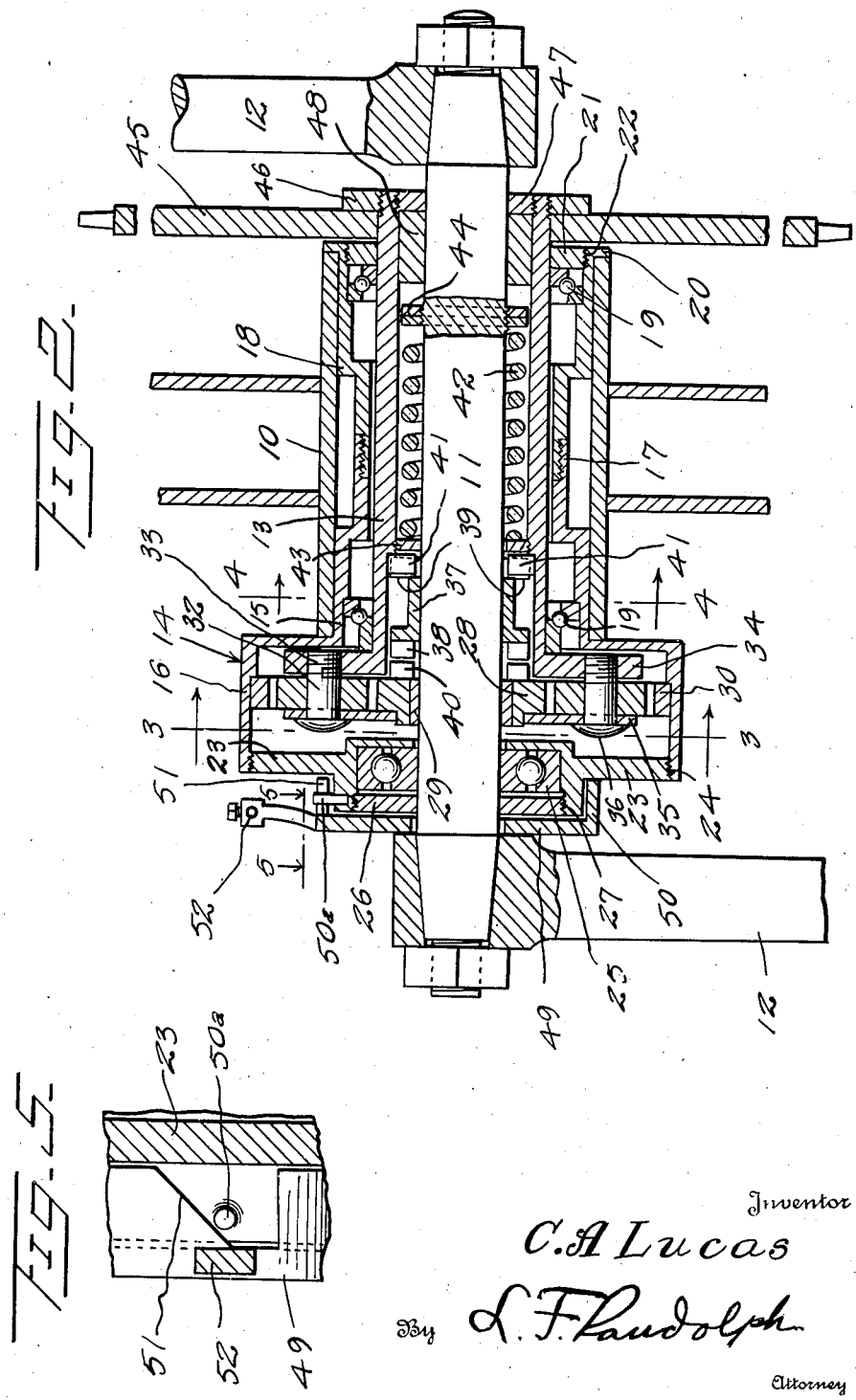

2,392,250

UNITED STATES PATENT OFFICE 2,392,250

TWO-SPEED POWER TRANSMISSION

Clifford A. Lucas, South Charleston, W. Va.

Application January 26, 1944, Serial No. 519,805

2 Claims. (Cl. 74—280)

This invention relates to a two-speed power transmission particularly for bicycles.

It is aimed to provide a construction which may be mounted either in the hanger housing or the pedal crank bearing on a bicycle or be used as an auxiliary transmission thereon.

In addition, it is aimed to provide a structure which is much stronger than the transmissions employed in the rear coaster brake assembly, and one which will permit greater ratios and the use of larger gears and sturdier construction throughout.

Further, it is aimed to provide a structure which may be readily installed, is accessible for repairs and is capable of manufacture from turned stock or by forming and drawing dies.

The more specific objects and advantages will become apparent from a consideration of the description following taken in connection with accompanying drawings illustrating an operative embodiment.

In said drawings:

Figure 1 is an end elevation of the assembly;

Figure 2 is a longitudinal sectional view taken on the line 2—2 of Figure 1;

Figure 3 is a cross section taken on the line 3—3 of Figure 2;

Figure 4 is a cross section taken on the line 4—4 of Figure 2; and

Figure 5 is a detail taken on the line 5—5 of Figure 2.

Referring specifically to the drawings wherein like reference characters designate like or similar parts, a conventional hanger housing or sleeve as used for the pedal crank bearing on a bicycle, is shown at 10. My improvements or transmission may be mounted in such housing or it may be clamped to the bicycle frame otherwise so that it may be used as an auxiliary transmission.

In carrying out the invention, 11 represents an axle or shaft equipped with cranks 12 at opposite ends having conventional pedals thereon as usual, such cranks being preferably removably attached to the axle 11 as shown or otherwise. Shaft 11 is concentric within a drive sleeve 13 and is longitudinally slidable with respect to the latter. The drive sleeve is journaled in the housing 10.

The drive sleeve 13 is located within a housing generally designated 14. This housing has a main section 15 provided with an enlargement at 16. Detachably screw threaded to the housing section 15 at 17 is a housing section 18, and between such sections 15 and 18 and the drive sleeve, suitable bearings 19 may be interposed, being small roller or ball bushings or otherwise. The enlargement 16 abuts one end of the hanger 10 while an outwardly-extending flange 20 on section 18 abuts the other end of such hanger. The latter end has a washer or ring 21 threaded to the section 18 as at 22.

At the other end of the structure, the enlargement 16 is closed by an end plate 23 screw threaded in place as at 24, and mounting a suitable bearing device 25 rotatably and slidably mounting the shaft 11, the bearing device being held in place by a closure or disc 26 screw threaded in the end plate 23 as at 27.

Shaft 11 is slidable through and loosely mounts a central concentric gear wheel 28, the latter preferably being provided with a bushing 29 in its bore or hub opening.

A ring gear or annular row of gear teeth 30 is secured internally of the enlargement 16 and enmeshed with the teeth thereof and with the teeth of the central gear wheel 28 are a desired number of planetary gear wheels or pinions 31. Such pinions 31 are journaled on stub shafts 32 which may be screws or bolts screw threaded as at 33 to the outwardly extending flange 34 on the drive sleeve 13. Screws 33 also pass through a wing-shaped plate 35 and outwardly of the latter have overlapping heads at 36 in order to hold such plates 35 against the central gear 28 to operatively locate it between the plates and the flange 34.

Rigid on the shaft or axle 11 is a clutch member 37 having clutch teeth 38 at one end and clutch teeth 39 at the other end. Central gear 28 has clutch teeth at 40 which are adapted for engagement by the clutch teeth 38 and teeth 39 are free, and the latter teeth are engageable with clutch teeth 41 on the interior of the drive sleeve 13, when the teeth 38 and 40 are disengaged.

A coil spring 42 surrounds the axle or shaft 11 within the drive sleeve 13, at one end abutting an element 43 through which the shaft slides and which element is screwed to the interior of the drive sleeve 13. At its other end, such spring 42 abuts one or more elements 44 screwed to the axle or shaft 11 and slidable therewith.

The drive sleeve 13 is adapted to impart its motion of rotation in any suitable manner as by means of a sprocket wheel 45 rigid thereon, to a sprocket chain, which in turn will drive the rear wheel of the bicycle or any equivalent. Sprocket 45 may be removably splined to the drive sleeve 13 and held against accidental displacement by a nut 46 screw threaded on said sleeve. In addition, an internal or ring nut 47 is screwed to such sleeve, and positions a bearing or bushing 48 within the adjacent end of the drive sleeve, to aid in mounting the axle or shaft 11.

Normally the clutch teeth 39 and 41 are engaged whereby a direct drive from the shaft 11 is imparted to the drive sleeve 13. However, any suitable means may be provided to slide the axle or shaft 11 to the left in Figure 2 to engage the clutch teeth 38 and 40 and maintain them engaged so that an indirect drive from the shaft 11 to the drive sleeve 13 is effected at a different speed, the drive being from the shaft 11, through the clutch teeth 38, clutch teeth 40, central gear 28, planetary gear 31 and the drive sleeve 13 to the sprocket 45.

As one means whereby the axle or shaft 11 may be moved to the left, a rocker cap 49 is loose on shaft 11 and has an annular flange 50 surrounding a portion of the end plate 23. The element 49 rocks on the axis of the axle 11 and is always in engagement with the disc 26 and the adjacent crank 12. One or any desired number of pins or projections 50a may radiate outwardly from the closure 23 and may be engaged by cams 51 on the rocker 49. Thus, when the rocker 49 is rotated in one direction by any suitable means that are operable from the handle bar of the bicycle and operatively connected to a crank 52 on the rocker, the cams 51 by bearing against the pins 50, will move element 49 to the left as it is rocked, and since it bears against the adjacent crank 12, will slide the shaft or axle 11 to the left, disengaging the clutch 39 and 41 and engaging those at 38 and 40, and at the same time causing the abutment 44 to compress the spring 42, so that when the cam element 49 is released from the position effecting engagement of clutch teeth 38 and 40, the spring 42 through expansion, will restore the teeth 37 and 41 into engagement or normal position.

Various changes may be resorted to provided they fall within the spirit and scope of the invention.

I claim as my invention:

1. A structure of the class described comprising a drive sleeve, a shaft rotatable and axially slidable therein, a clutch on the drive sleeve, means including planetary gears having a clutch to clutch the shaft to the first-mentioned clutch, a housing about the drive sleeve, the drive sleeve having an outwardly extending flange, means mounted by the outwardly extending flange journaling the planetary gears, gear teeth on the housing engaged by the planetary gears, a gear enmeshed with the planetary gears mounted on and through which the shaft slides, and means overlapping and positioning the central gear held in place by the mounting of the planetary gears.

2. A structure of the class described comprising a drive sleeve, a shaft rotatable and axially slidable therein, a clutch on the drive sleeve, means including planetary gears having a clutch to clutch the shaft to the first-mentioned clutch, a housing about the drive sleeve, the drive sleeve having an outwardly extending flange, means mounted by the outwardly extending flange journaling the planetary gears, gear teeth on the housing engaged by the planetary gears, a gear enmeshed with the planetary gears mounted on and through which the shaft slides, means overlapping and positioning the central gear held in place by the mounting of the planetary gears, abutments in spaced relation extending one from the drive sleeve and one from the shaft, a coil spring surrounding the shaft and engaging said abutment so as to be compressed when certain of the clutch teeth are engaged to bias the other clutch teeth into and toward engaged position, and cam means associated with the shaft and the housing operable to slide them relatively to engage certain of the clutch teeth.

CLIFFORD A. LUCAS.